United States Patent
Mackey-Ponte

(10) Patent No.: US 10,531,766 B1
(45) Date of Patent: Jan. 14, 2020

(54) OVEN COOKING IMPLEMENT

(71) Applicant: Adreama Mackey-Ponte, Floral Park, NY (US)

(72) Inventor: Adreama Mackey-Ponte, Floral Park, NY (US)

(*) Notice: Subject to any disclaimer, the term of this patent is extended or adjusted under 35 U.S.C. 154(b) by 362 days.

(21) Appl. No.: 15/392,457

(22) Filed: Dec. 28, 2016

Related U.S. Application Data

(60) Provisional application No. 62/272,650, filed on Dec. 29, 2015.

(51) Int. Cl.
| | | |
|---|---|---|
| A47J 37/00 | (2006.01) | |
| A47J 37/08 | (2006.01) | |
| A47J 43/18 | (2006.01) | |
| A47J 37/04 | (2006.01) | |

(52) U.S. Cl.
CPC ......... *A47J 37/0871* (2013.01); *A47J 37/041* (2013.01); *A47J 43/18* (2013.01)

(58) Field of Classification Search
CPC .... A47J 37/041; A47J 37/042; A47J 37/0871; A47J 43/18
USPC ..... 99/394, 397, 398, 400, 421 A, 427, 439, 99/449, 450
See application file for complete search history.

(56) References Cited

U.S. PATENT DOCUMENTS

| | | | | |
|---|---|---|---|---|
| 1,205,461 A | * | 11/1916 | McCulloch | A47J 37/0694 99/397 |
| 1,741,400 A | * | 12/1929 | Bocchino | A47J 37/041 452/185 |
| 1,794,870 A | * | 3/1931 | Serrell | A47J 37/0694 99/351 |
| 2,297,825 A | * | 10/1942 | Bobo | A47J 37/041 126/41 B |
| 2,681,001 A | * | 6/1954 | Smith | A47J 37/0704 99/349 |
| 4,005,646 A | | 2/1977 | Kruper | |
| 4,625,634 A | | 12/1986 | Kruper | |
| 5,755,153 A | * | 5/1998 | Su | A47J 37/049 99/395 |
| D609,525 S | | 2/2010 | Rabanal | |
| 2008/0289511 A1 | | 11/2008 | Mendez | |
| 2014/0338545 A1 | | 11/2014 | Ramadan | |

* cited by examiner

*Primary Examiner* — Reginald Alexander
(74) *Attorney, Agent, or Firm* — Shifrin Patent Law; Dan Shifrin

(57) ABSTRACT

A cooking implement is provided. The cooking implement provides a grilling basket having opposing gridirons adapted to support and/or suspend food therein. The gridirons are pivotally connected and include locking handles for securing the basket around the food therein. The cooking implement further includes a drip pan adapted to hold the grilling basket thereon and catch fluids released by the foods being cooked in the grilling basket.

4 Claims, 5 Drawing Sheets

OVEN COOKING IMPLEMENT

RELATED APPLICATION DATA

The present application claims the benefit of commonly-owned U.S. Provisional Application Ser. No. 62/272,650 entitled BROILER MATE, filed on Dec. 29, 2015, which application is incorporated herein by reference in its entirety.

TECHNICAL FIELD

The present invention relates generally to cooking and, in particular, to an implement for using an oven broiler as a substitute for a grill.

BACKGROUND ART

Grilling is a preferred cooking method for many individuals, especially when cooking meats, vegetables, and even fruits. Cooking over an open flame can give food a char-grilled flavor giving it grill marks and making the food all the more appetizing. Unfortunately, however, food cannot always be cooked on a grill. For example, rainy and/or cold, winter weather can deter people from grilling. Moreover, there are those that simply do not have access to a grill. Some people may be reluctant to use stove-top grilling substitutions or even pan fry meats because of the smoke and odor such cooking methods produce, which may permeate indoor fabrics and/or linger for long periods of time, especially in smaller homes and apartments.

SUMMARY OF THE INVENTION

An oven cooking implement, comprising a grill basket and a drip pan. The grill basket comprises: a first gridiron; a second gridiron pivotally connected at a first end to a first end of the first gridiron; first and second elongated handles secured to second ends of the first and second gridirons; and a latch mechanism configured to releasably secure the first handle to the second handle, whereby the first and second gridirons are movable between an open position and at least a first closed position in which the first and second gridirons form an interior volume therebetween in which food to be cooked is retained. The a drip pan comprises a planar bottom with raised sidewalls and first and second posts extending from opposite first and second ends of the sidewalls approximately perpendicular to the bottom, wherein the first post is adapted to receive the first ends of the first and second gridirons and the second post is adapted to receive the first and second handles of the first and second gridirons.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
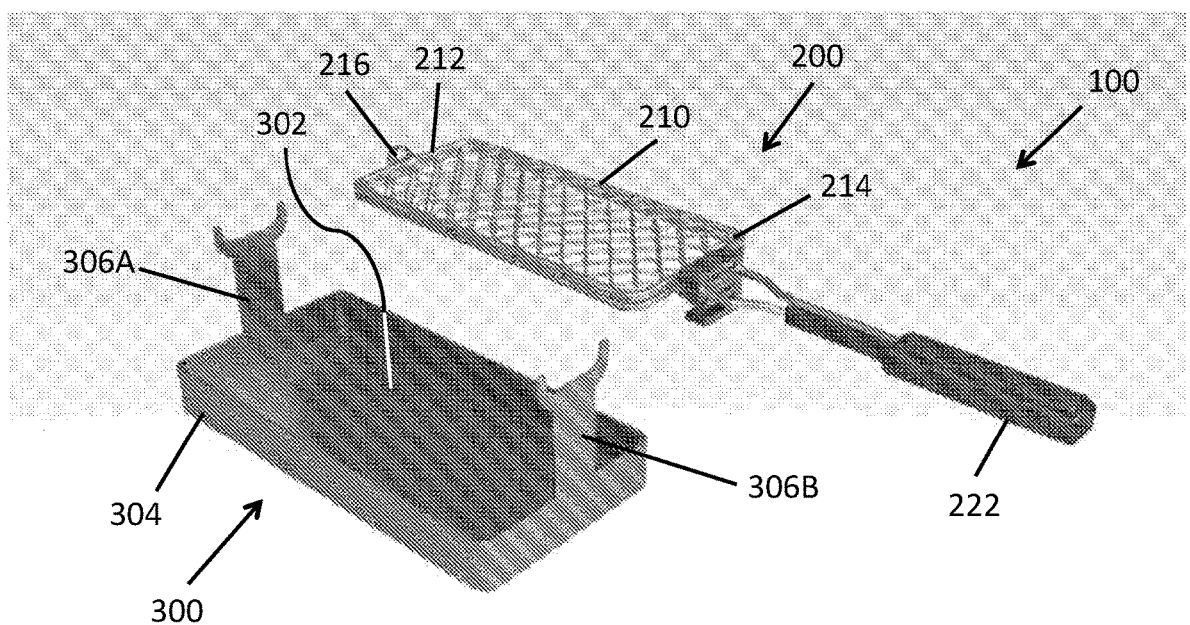
FIG. 1 is a perspective view of an embodiment of the cooking implement of the present invention.

Referring now to FIG. 1, there is shown a perspective view of a cooking implement 100 according to one embodiment of the present invention. The cooking implement 100 provides a grill basket 200 for supporting or suspending food in an oven and a drip pan 300 for catching grease released thereby. The cooking implement 100 enables a user to grill or flame cook food inside his or her oven without having to utilize an outdoor or indoor grill.

The grill basket 200 comprises opposing first and second gridirons 210A, 210B (collectively 210) forming an interior volume therebetween. Each gridiron 210A, 210B comprises a first, outer end 212A, 212B (collectively 212) and a second, inner inner end 214A, 214B (collectively 214), wherein the gridirons 200 are pivotally connected at their first ends via extensions (216A, 216B; collectively 216). The gridirons 210 may be composed of any heat-resistant material, such cast iron, stainless steel or the like. The gridirons 210 may have diamond configurations, boxed configurations, or other special configurations having designs for branding food grilled thereon. In the depicted embodiment, the gridirons 210 are rectangular in shape; however, in alternative embodiments, the gridirons may be any other shape, such as square, circular, elliptical fish-shape, etc.

Figure 2:
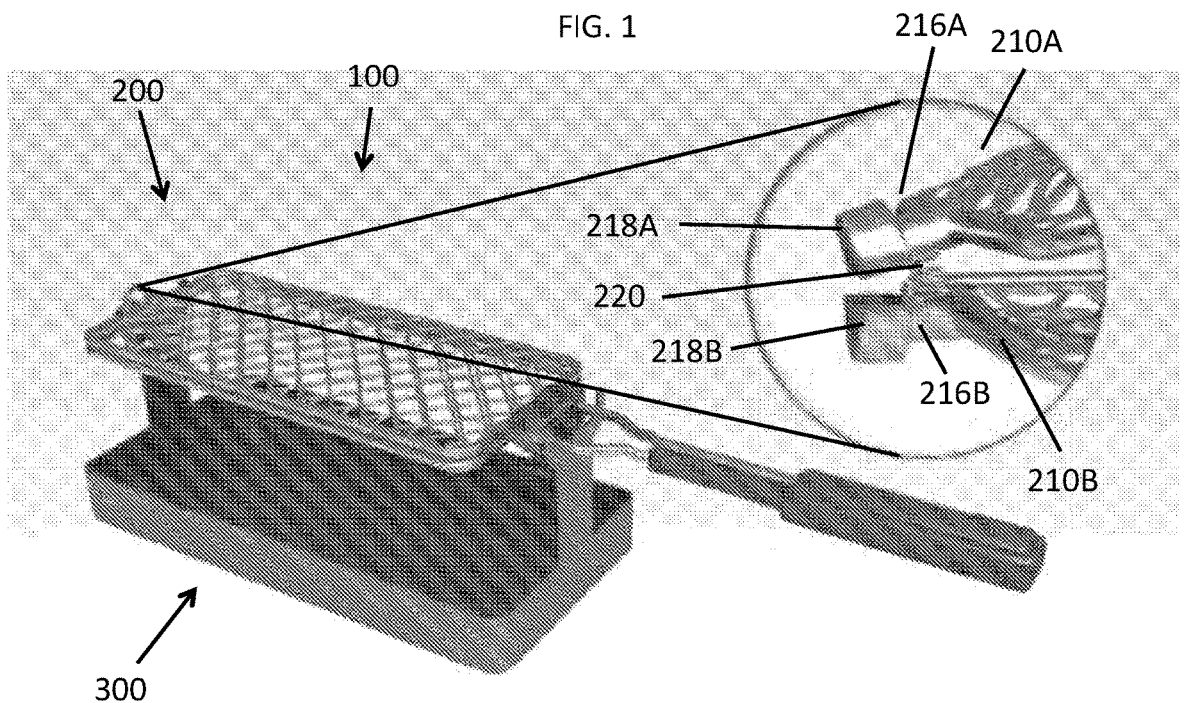
FIG. 2 is a perspective view of the cooking implement of FIG. 1 with the cooking basket in place on the drip pan.

The cooking implement 100 further comprises the drip pan 300 for catching the fluids dripping from foodstuff cooked using the gridirons 210. The pan 300 includes a trough with a planar bottom 302 and raised sidewalls 304. The trough 302 preferably has an area that is approximately equal to or greater than the area of the gridirons 210. The pan 300 further includes a first end having a first fork-like post 306A and a second end, opposite the first end, having a second fork-like post 306B, wherein the posts (collectively 306) extend from the sidewall 304 and are approximately perpendicular to the bottom of the trough 302. The posts 306 are adapted to receive the extensions 216 of the first and second ends of the gridirons 210, as shown in FIG. 2. The posts 306 allow for easy rotation of a basket 200 resting thereon, so as to allow a flame access to both sides of the food inside the basket 200 for even cooking. The drip pan 300 may be composed of any durable heat-resistant metal, such as iron, steel, or the like, and may be coated or layered with any non-stick cooking material.

Referring now to the close-up in FIG. 2, there is shown a close-up view of the extensions 216 of the basket 200 according to one embodiment of the present invention. The extensions 216 comprise pivotal connected protruding and opposing facing members 218A, 218B (collectively 218) disposed at the first, outer ends 212 of the gridirons 210 that are configured to removably affix to the upstanding fork-like posts 306. In the depicted embodiment, the protruding and opposing facing members 218 are connected by a spring-like mechanism 220, which thereby creates an interconnection between the first and second gridirons 210A, 210B. The spring-like mechanism 220 may comprise a tight coil spring. The spring-like mechanism 220 allows lateral and vertical movement of gridirons 210 relative to one another, such that a person may adjust the gridirons 210 to accommodate a variety of differently sized foods put between them. In other embodiments, the extensions 216 may be hingedly connected via a hinge, providing a user vertical movement of the gridirons 210. The extensions 216 are further adapted to be received in the fork-like posts 306 of the drip pan 300 and are adapted to be rotatable thereon, enabling a user to rotate the basket 200 while on the posts 306.

Figure 3A:
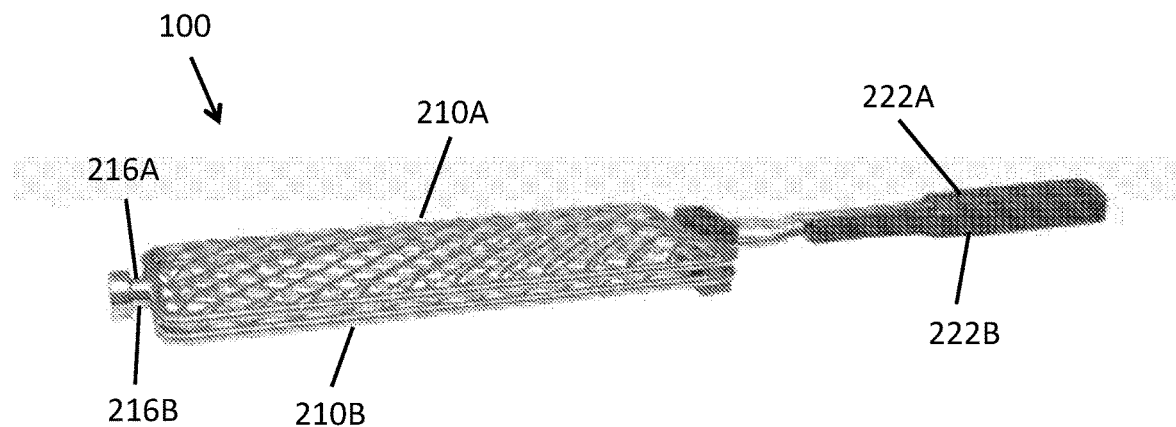
FIG. 3A is a perspective view of the cooking basket in a tight, closed configuration.
Figure 3B:
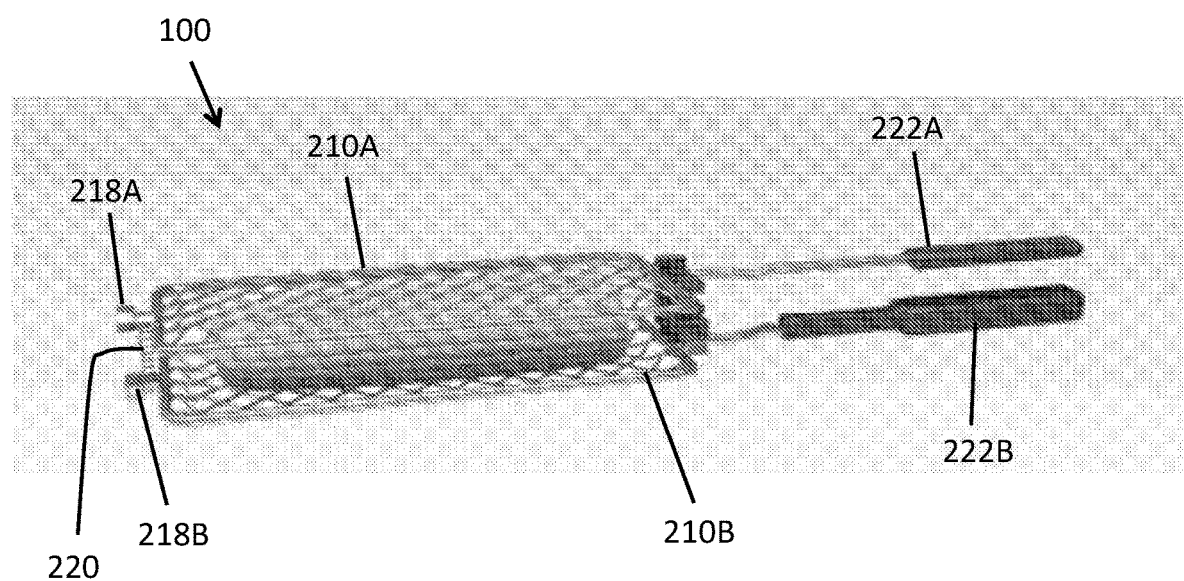
FIG. 3B is a perspective view of the cooking basket in a loose, closed configuration.

Referring now to FIGS. 3A, 3B, there are shown perspective views of the grilling basket 200 in a fully closed configuration (FIG. 3A) for relatively tin food items and storage and a looser, partially open configuration for thicker food items (FIG. 3B). In the shown embodiment, an upper elongated handle 222A is secured to the second end 214A of the first gridiron 210A and a lower elongated handle 222B is secured to the second end 214B of the second gridiron 210B. The elongated handles (collectively 222) are removably attachable to one another and enable a user to open and close the basket 200 as well as rotate it when cooking. The handles 222 may comprise a grip composed of tacky material or adhesive-like material, such that a user may obtain a good grip on the handle. Further, the handles 222 may be composed of heat-resistant material, such as Insulflex® or Silicaflex™.

In the depicted embodiment, the handles 222 include a latch mechanism 230.

Figure 4A:
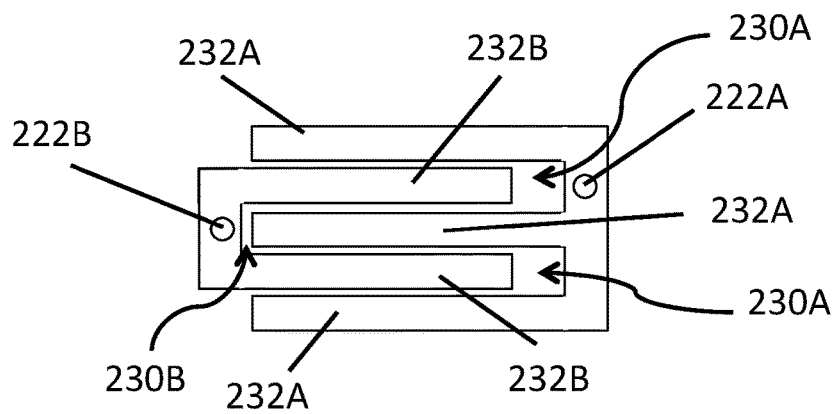
FIG. 4A is a schematic end view of the latch mechanism of the cooking basket in the tight, closed position of FIG. 3A.
Figure 4B:
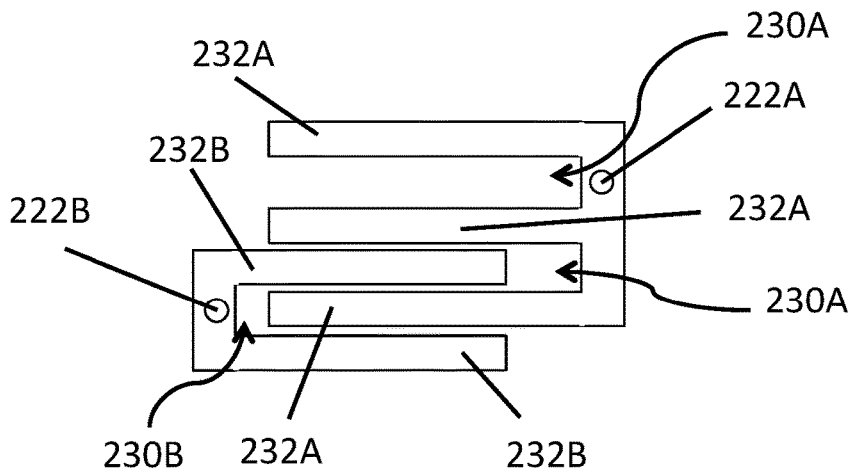
FIG. 4B is a schematic end view of the latch mechanism of the cooking basket in the loose, closed position of FIG. 3B.
Figure 4C:
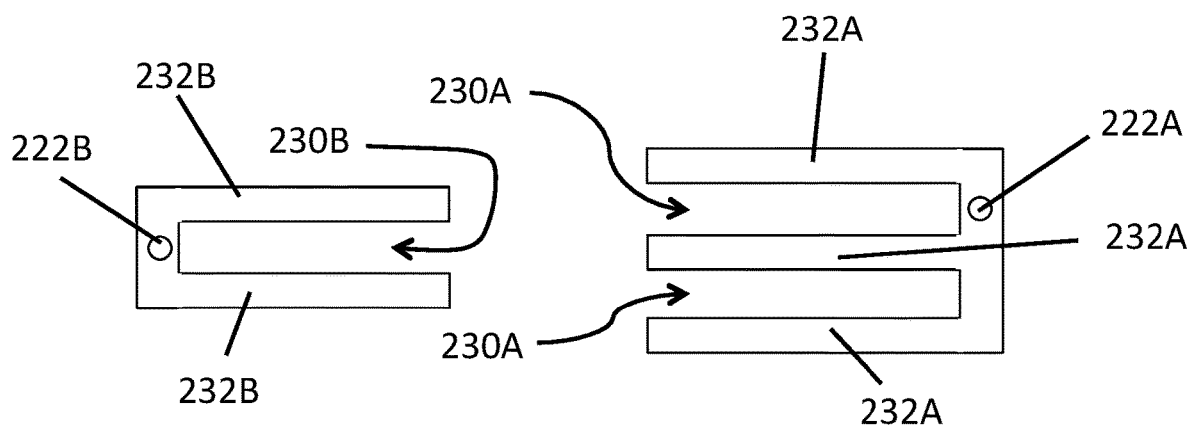
FIG. 4C is a schematic end view of the latch mechanism of the cooking basket in a separated position.
Figure 5A:
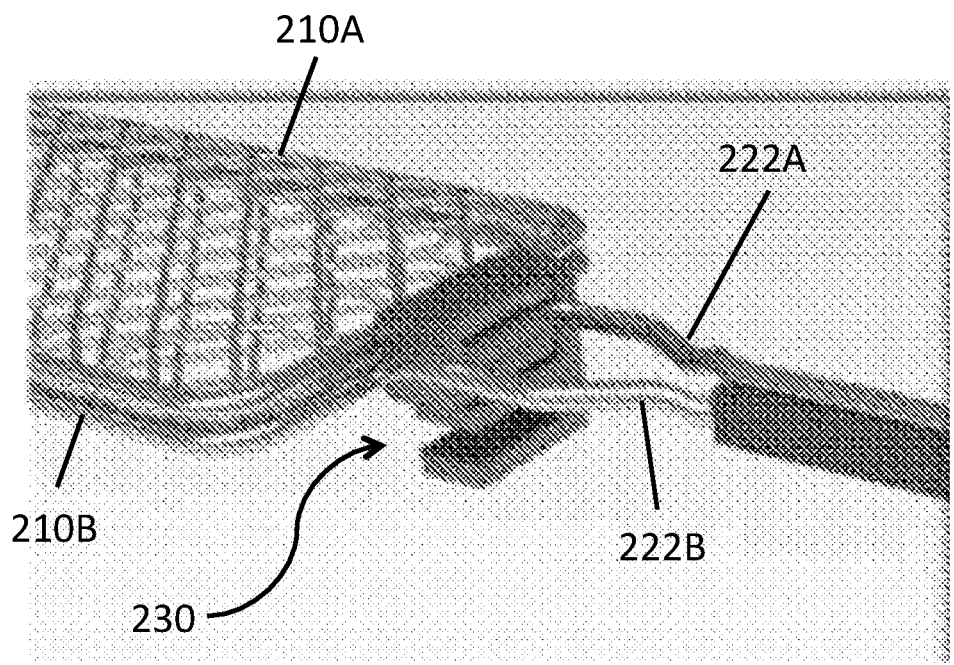
FIG. 5A is a close-up view of the latch of the cooking basket in the tight, closed configuration of FIG. 3A.
Figure 5B:
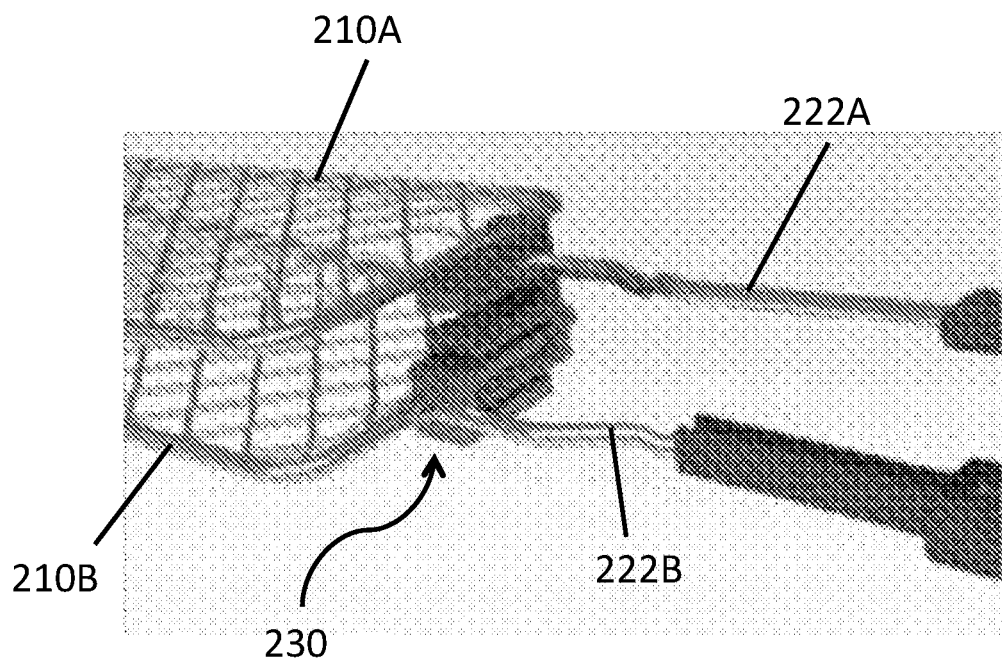
FIG. 5B is a close-up view of the latch of the cooking basket in the loose, closed configuration of FIG. 3B.

The upper handle 222A comprises a first set of extensions 234A on the inner end parallel to the first gridiron 210A with slots 232A therebetween. The lower handle 222B comprises a second set of extensions 234B on the inner end parallel to the second gridiron 210B with slots 232B therebetween. The first set of extensions 234A and slots 232A is adapted to mate and interleave with the second set extensions 234B and slots 232B. When the extensions 234A are inserted into the slots 232B and the extensions 234B are inserted into the slots 232A as represented in FIG. 4A, the handles 222 lock together and the basket 200 assumes a tightly closed configuration for relatively thin food items (FIG. 3A; see also FIG. 5A). When the extensions 234A are inserted into the slots 232B and the extensions 234B are inserted into the slots 232A as represented in FIG. 4B, the handles 222 lock together and the basket 200 assumes a loosely closed configuration for thicker food items (FIG. 3B; see also FIG. 5B). When the upper handle 222A is released from the lower handle 222B as represented in FIG. 4C, the basket 200 assumes an open configuration that is movable via the spring-like mechanism 220 connecting the first ends 212 of the gridirons 210. Thus, the gridirons 210 enable a user to open the basket 200 into fully open configuration (not shown) providing access to the interior volume of the basket 200 for laying or resting food therein. It will be appreciated that in other embodiments, the latch mechanism 230 may have a different number of slots and extensions than are shown in the FIGs., allowing the basket 200 to be latched in more than the two positions shown.

Figure 6:
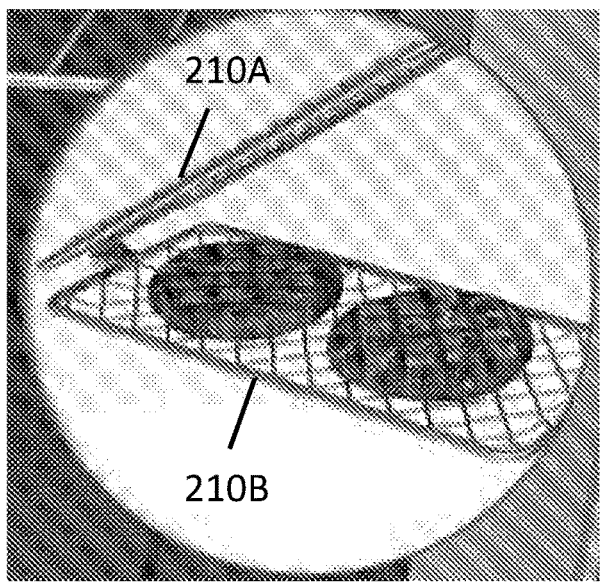
FIG. 6 is a close-up view of the cooking basket in an open position.
Figure 7:
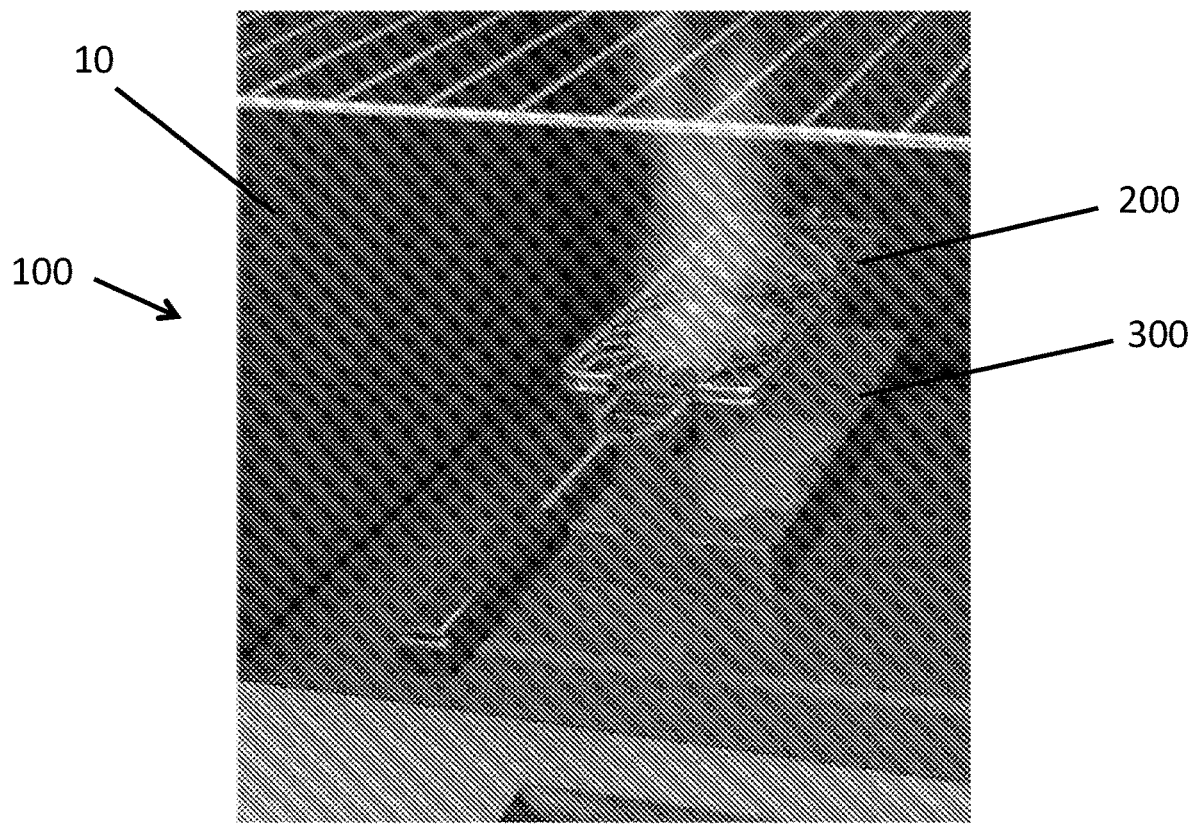
FIG. 7 is a perspective view of the cooking implement of FIG. 1 in an oven.

Referring now to FIGS. 6, 7, there is shown the cooking implement 100 in use according to one embodiment of the present invention. In one use, the user inserts the drip pan 300 into the oven 10. The user then opens the basket 200 by unlocking the handles 222 and inserts the food, such as the hamburger patties shown, on one of the gridirons 210 (FIG. 6). The user then locks the handles 222 back together to secure the gridirons 210 tightly around the food. The user than rests the basket 200 on the drip pan 300 via the fork-like posts 306 (FIG. 7) and sets the oven 10 to flame broil or other desired setting. The user may periodically rotate the basket 200 about the posts 306 via the handle 222 to ensure that the food is evenly and thoroughly cooked throughout.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

What is claimed is:

1. An oven cooking implement, comprising:
 a grill basket, comprising:
  a first gridiron;
  a second gridiron pivotally connected at a first end to a first end of the first gridiron;
  first and second elongated handles secured to second ends of the first and second gridirons; and
  a latch mechanism configured to releasably secure the first handle to the second handle, whereby the first and second gridirons are movable between an open position and at least a first closed position in which the first and second gridirons form an interior volume therebetween in which food to be cooked is retained, the latching mechanism comprising:
   a first plurality of extensions on an inner end of the first handle with a slot between adjacent extensions; and
   a second plurality of extensions on an inner end of the second handle with a slot between adjacent extensions, the second plurality of extensions adapted to mate and interleave with the slots between the first plurality of extensions and the first plurality of extensions adapted to mate and interleave with the slots between the second plurality of extensions;
   wherein:
    when the first and second extensions are in a first configuration, the first handle is releasably secured to the second handle in the first closed position; and
    when the first and second extensions are in a second configuration, the first handle is releasably secured to the second handle in a second closed position;
    wherein the first closed position is a tightly closed position and the second closed position is a loosely closed position; and
 a drip pan, comprising:
  a planar bottom with raised sidewalls; and first and second posts extending from opposite first and second ends of the sidewalls approximately perpendicular to the bottom, wherein:
the first post is adapted to receive the first ends of the first and second gridirons; and
the second post is adapted to receive the first and second handles of the first and second gridirons.

2. The oven cooking implement of claim 1, further comprising a spring pivotally connecting the first and second gridirons.

3. The oven cooking implement of claim 1, wherein:
the first plurality of extensions comprises three extensions having two slots therebetween; and
the second plurality of extensions comprises two extensions having one slot therebetween.

4. The oven cooking implement of claim 1, wherein the first and second handles are formed from a heat-resistant material.

\* \* \* \* \*